United States Patent
Bongaarts et al.

(10) Patent No.: US 10,694,237 B2
(45) Date of Patent: Jun. 23, 2020

(54) WIRELESS DELIVERY OF BROADCAST DATA

(71) Applicant: T-Mobile USA, Inc., Bellevue, WA (US)

(72) Inventors: Paul Bongaarts, Issaquah, WA (US); Andrew Gapin, Seattle, WA (US); Otto Fonseca Escudero, Snoqualmie, WA (US); Dinesh Kumar, Sammamish, WA (US); Marie Grace Jacinto, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/828,297

(22) Filed: Nov. 30, 2017

(65) Prior Publication Data

US 2019/0045249 A1    Feb. 7, 2019

Related U.S. Application Data

(60) Provisional application No. 62/541,588, filed on Aug. 4, 2017.

(51) Int. Cl.
*H04N 7/10* (2006.01)
*H04N 21/258* (2011.01)
(Continued)

(52) U.S. Cl.
CPC ....... *H04N 21/25891* (2013.01); *H04L 43/16* (2013.01); *H04N 21/2401* (2013.01);
(Continued)

(58) Field of Classification Search
CPC ....... H04N 21/25891; H04N 21/64738; H04N 21/6131; H04N 21/8456; H04N 21/2181; H04N 21/4331
(Continued)

(56) References Cited

U.S. PATENT DOCUMENTS 8,270,324 B2    9/2012 Li et al.
2004/0008657 A1    1/2004 Lee et al.
(Continued)

FOREIGN PATENT DOCUMENTS

EP    3148151 A1    3/2017
KR    20050098199    10/2005

OTHER PUBLICATIONS

The PCT Search Report and Written Opinion dated Oct. 26, 2016 for PCT Application No. PCT/US2018/041508, 9 pages.
(Continued)

*Primary Examiner* — Jivka A Rabovianski
(74) *Attorney, Agent, or Firm* — Lee & Hayes, P.C.

(57) ABSTRACT

Systems and methods for improved efficiency in content streaming and downloading. The system enables a first list including a plurality of user equipment (UE) in communication with a wireless base station (WBS) to be identified based on the likelihood that each UE will download a piece of content. The process starts in response to a UE requesting the content from the WBS or some other triggering event. The system can use the content and subscriber history from the plurality of UEs along with machine learning, or some other algorithm, to identify likely candidates. The system can calculate a similarity score, or similar, comparing the requested content to the content history for each of the plurality of UEs. The system can add each UE with a sufficiently high similarity score to a second list. The content can be broadcast to all UEs on the second list in a single broadcast transmission.

18 Claims, 8 Drawing Sheets

(51) Int. Cl.
  *H04L 12/26*  (2006.01)
  *H04N 21/647* (2011.01)
  *H04N 21/24*  (2011.01)
  *H04N 21/25*  (2011.01)
  *H04N 21/61*  (2011.01)

(52) U.S. Cl.
  CPC ....... *H04N 21/2407* (2013.01); *H04N 21/252* (2013.01); *H04N 21/64738* (2013.01); *H04N 21/6131* (2013.01)

(58) Field of Classification Search
  USPC .......................................... 725/34, 81, 87, 14
  See application file for complete search history.

(56) References Cited

U.S. PATENT DOCUMENTS

| | | | | |
|---|---|---|---|---|
| 2007/0224997 | A1 | 9/2007 | Florkey et al. | |
| 2009/0258659 | A1 | 10/2009 | Kim et al. | |
| 2009/0300174 | A1* | 12/2009 | Floris | G06Q 10/06 709/224 |
| 2010/0076968 | A1* | 3/2010 | Boyns | H04W 4/21 707/732 |
| 2011/0063440 | A1* | 3/2011 | Neustaedter | H04N 5/144 348/143 |
| 2011/0296006 | A1 | 12/2011 | Krishnaswamy et al. | |
| 2013/0311408 | A1* | 11/2013 | Bagga | G06N 99/005 706/12 |
| 2014/0226594 | A1 | 8/2014 | Liu | |
| 2014/0342712 | A1 | 11/2014 | Madhavan et al. | |
| 2014/0375883 | A1 | 12/2014 | Meek et al. | |
| 2015/0003234 | A1 | 1/2015 | Samardzija et al. | |
| 2016/0135016 | A1* | 5/2016 | Zou | H04W 4/06 370/312 |
| 2016/0142783 | A1* | 5/2016 | Bagga | H04N 21/4668 725/47 |
| 2016/0283585 | A1* | 9/2016 | Zheng | G06F 17/30675 |
| 2017/0149855 | A1* | 5/2017 | Doshi | H04L 65/4084 |
| 2019/0132047 | A1 | 5/2019 | Bongaarts et al. | |

OTHER PUBLICATIONS

The PCT Search Report and Written Opinion dated Oct. 29, 2018 for PCT Application No. PCT/US18/42842, 9 pages.

Zhu et al, "Virtual Base Station Pool: Towards a Wireless Network Cloud for Radio Access Networks", retreived at <<https://dl.acm.org/citation.cfm?id=2016646>>, ACM International Conference on Computing Frontiers, May 2011, 10 pgs.

Office Action for U.S. Appl. No. 15/799,505, dated May 17, 2019, Bongaarts, "Wireless Delivery of Broadcast Data", 11 pages.

* cited by examiner

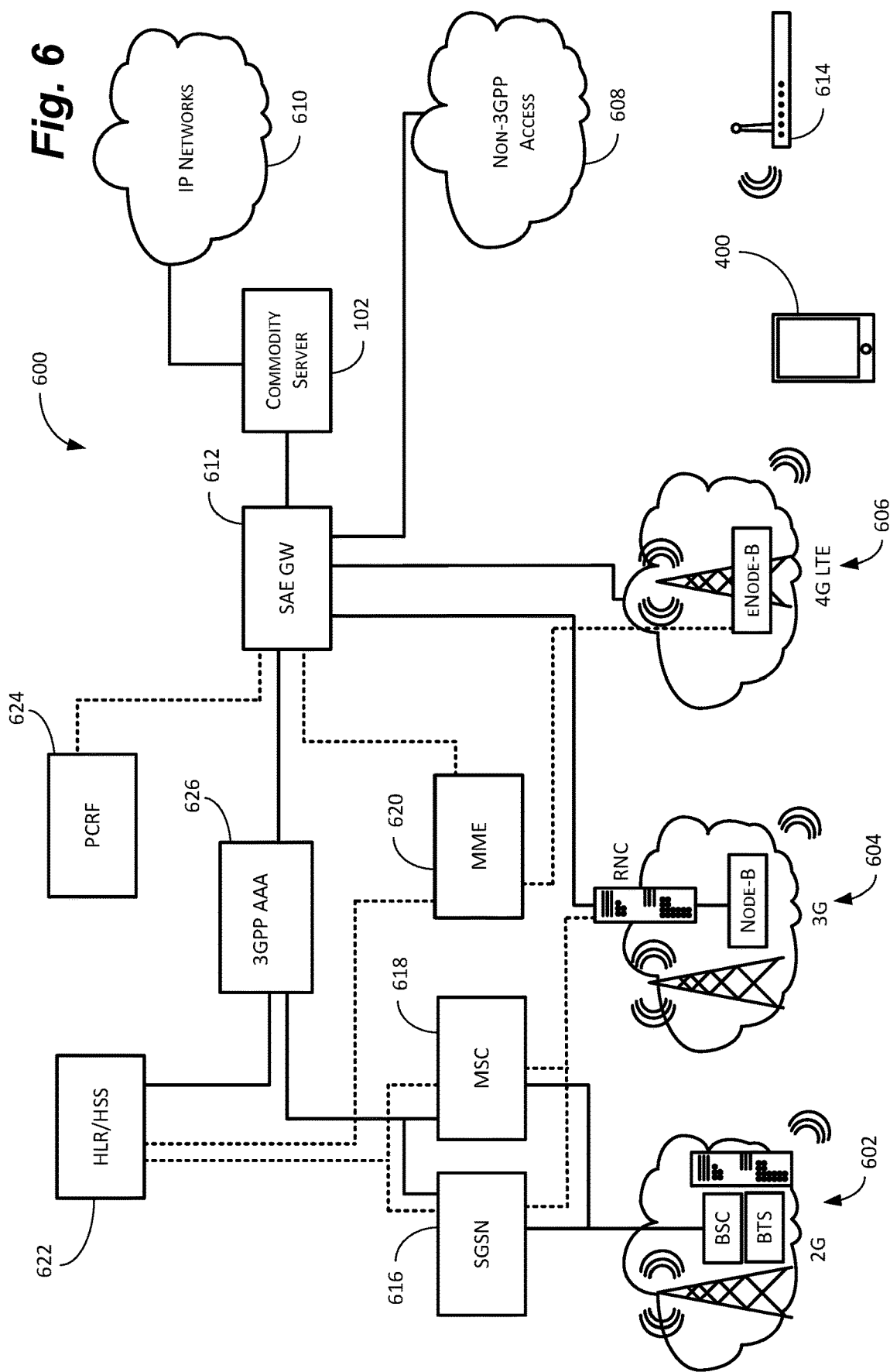

WIRELESS DELIVERY OF BROADCAST DATA

CROSS REFERENCE TO RELATED APPLICATIONS

This Application is a non-provisional of, and claims priority under 35 U.S.C. § 119(e) to, U.S. Provisional Application No. 62/541,588, filed Aug. 4, 2017, of the same title, the entire disclosure of which is hereby incorporated by reference in its entirety.

BACKGROUND

Data can be sent wirelessly to multiple users in a variety of ways. The data can be sent unicast, or "end-to-end," in which data is sent by a provider (e.g., a digital content provider on the Internet) and routed through the Internet, cellular core network, wireless base stations (WBSs) and directly to the end user. When multiple users request the same data from the same cell site at substantially the same time or request a live stream, however, the data can be broadcast from the WBS to multiple users at the same time. In other words, though the data is being sent to multiple users, it need only be transmitted wirelessly once by a particular cell site, which saves wireless bandwidth.

Wireless broadcast is an efficient method to deliver data to multiple users, compared with sending unicast to each member individually. Technologies such as Evolved Multimedia Broadcast Multicast Services (eMBMS) and Long-Term Evolution Broadcast (LTE-B) have leveraged internet protocol (IP) multicast in the transport network to quickly replicate data packets from a content provider server towards the cell site, or wireless base station (WBS)—e.g., eNodeB.

Of course, when only a single user attached to a cell site requests some particular content via user equipment (UE), such as a cell phone or tablet computer, broadcasting the content does not provide any wireless bandwidth savings. In fact, there will be an additional amount of bandwidth wasted when broadcasting to only a single user, due to signaling overhead associated with the broadcast technology. Indeed, even if multiple users request the same content at slightly different times (within a couple of seconds or minutes), the content likely cannot be broadcast due to synchronization issues.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 is an example of a cellular and internet protocol network for use with the systems and methods disclosed herein, in accordance with some examples of the present disclosure.

DETAILED DESCRIPTION

Figure 1:
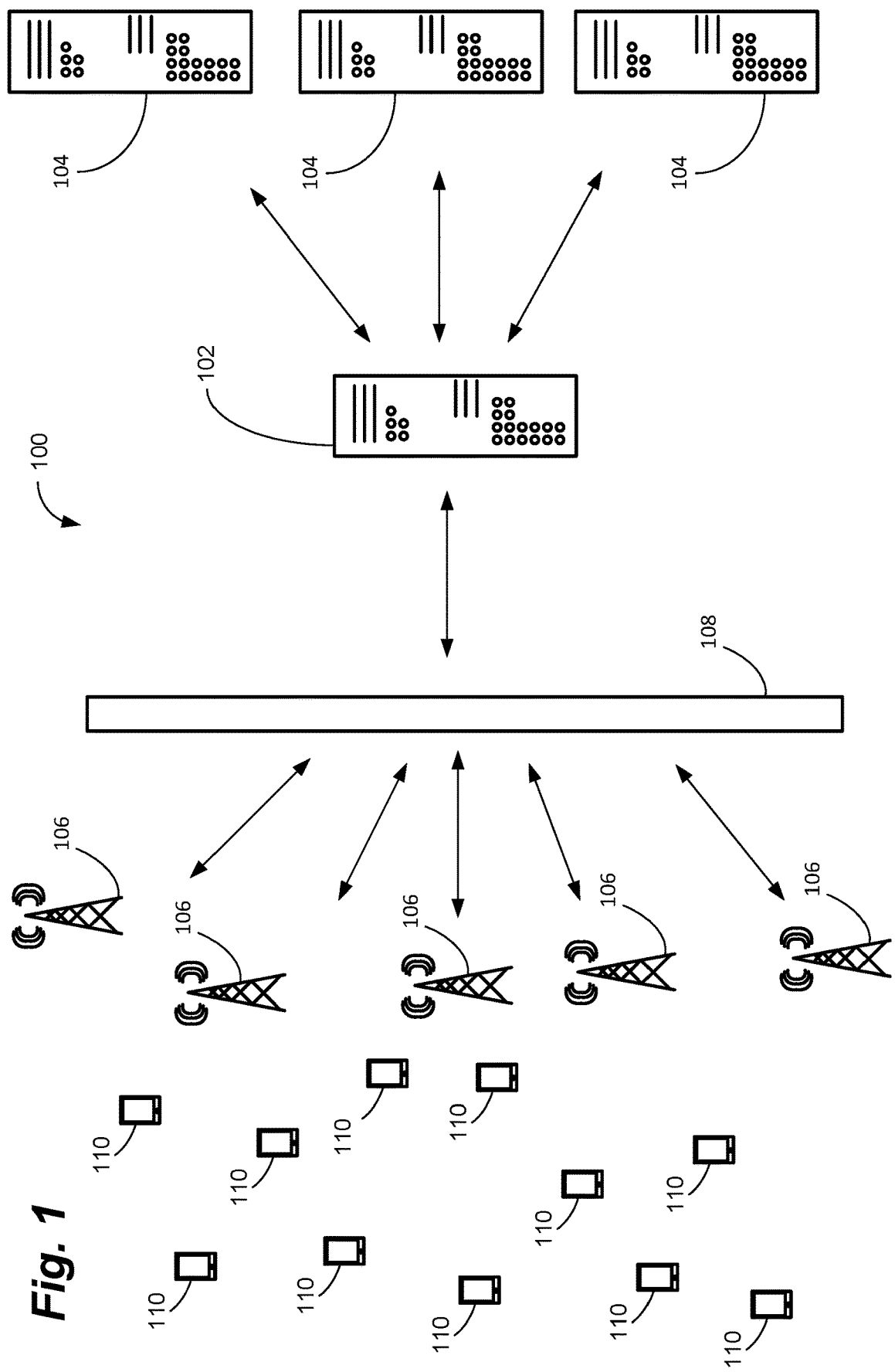
FIG. 1 depicts an example of a content-management server for providing content a plurality of user equipment (UEs) connected to a cellular core network using wireless broadcast, in accordance with some examples of the present disclosure.

Examples of the present disclosure can comprise systems and methods for providing IP broadcast services over a variety of cellular networks. The system receives requests for content from user equipment (UE) attached to a particular source, such as a cell site, or wireless base station (WBS). The system can then determine other users attached to the same WBS (or collection of WBSs) that might want to download the same content, in order to enable the content to be broadcast to multiple users at the same time. The system can predict user's behavior based on their user history, interests, and other factors. For those users who have not yet requested the content, the content can be downloaded and cached on the UE for later viewing and/or "drop-off" after, for example, a predetermined amount of time or when the cache on the UE is full.

As mentioned above, wired network communications (e.g., fiber optic, cable, T1, T3, and other wired connections) on the Internet and within the cellular core network provide essentially limitless capacity. Wired connections can transmit data on the order of terabytes per second. Due to the exponential increase in UE and wireless communications, however, wireless bandwidth is often at a premium. Thus, sending data to multiple users in a single broadcast is beneficial as it conserves wireless bandwidth. Sending 1 GB of data to 10 users in a single broadcast, for example, saves approximately 9 GB of wireless bandwidth (i.e., the 1 GB need only be sent wirelessly once).

Other than live broadcasts, however, it is relatively unusual that multiple users attached to the same WBS would request the same content at the same time. Thus, users that want to watch a live show, for example, can be part of the same broadcast because the time synchronization is the same for both users (i.e., "live" or substantially so). Users that each want to watch an episode of a television show from beginning to end, on the other hand, but that start watching the show at different times (e.g., 1, 5, or 10 minutes apart), could not be part of the same broadcast due to the time shift.

To this end, examples of the present disclosure can attempt to predict users that might want to download the same content as a user in a particular request and proactively download the content to multiple users using broadcast from cell sites to reducing wireless bandwidth requirements. Each UE can include a dedicated memory to store downloaded content for later consumption. Indeed, the system can enable service providers to steer users to certain content for which content providers have provided a discount or paid a promotional fee by downloading target content to users in favor of other, non-promoted, content.

To simplify and clarify explanation, the system is described below for use in connection with locating likely consumers of content and downloading content to users proactively. For simplicity, the system is described as using "machine learning," to identify potential consumers, including a "machine learning model." One of skill in the art will recognize, however, that a machine learning model is a generic term that includes a variety of models such as, for example, linear regression, logistic regression, decision tree, support vector machine (SVM), Naive Bayes, K-nearest neighbors (KNN), K-means, random forest, dimensional reduction algorithms, etc. Thus, the systems and methods described herein can be used anytime machine learning can be used to identify users with a high likelihood of downloading a particular file, or "content." Indeed, users may be identified based solely on the content provided in their UEs history, for example. In other words, a regular watcher of a particular show will likely download new episodes when they become available.

As shown in FIG. 1, examples of the present disclosure can comprise a system 100 for providing content to UEs from WBSs using broadcast on the wireless side to reduce bandwidth consumption. As mentioned above, the wired portion of the cellular network, or core network, has essentially unlimited bandwidth. High-speed cable, fiber optic, and other connections can provide incredible bandwidth (or, throughput); and, while they are not literally unlimited, transmissions speeds on the order of terabytes per second are possible with speeds growing exponentially over time. As a result, how the content is sent over the core network to the WBSs is somewhat irrelevant. Thus, in some examples, the present disclosure can use unicast transmission over the core network to provide content to WBSs to avoid broadcast compatibility issues. In other examples, the system can use Evolved Multimedia Broadcast Multicast Services (eM-BMS) and/or Long-Term Evolution Broadcast (LTE-B) to send the content over the core network to multiple WBSs at the same time in a single broadcast.

Regardless, the system 100 can comprise one or more content-management servers 102 configured to receive content from content-provider servers 104 and provide content to WBSs 106. The content-management server 102 can comprise a single server or one or more clouds of servers, ASICs, FPGAs, tablet computers, laptops, or other electronic devices. As discussed below, the content-management server 102 can receive content from the content-provider servers 104, receive requests and other data from WBSs 106, propagate the content across the core network 108, and/or use predictive algorithms to identify additional UEs 110 that are likely to request the same content in the near future.

The content-provider servers 104 can comprise servers, clouds of servers, or other computational devices used to stream broadcasts, podcasts, and other streaming content over the core network 108 and, in this case, ultimately to UEs 110 via the WBSs 106. The content-provider servers 104 can comprise third party content servers such as, for example, You Tube, TV streaming sites (e.g., Hulu), podcasts, and other third party content. The content-provider servers 104 can also comprise components of the core network 108 that store proprietary content and/or are configured to download content from third-party servers to make the content available "inside" the core network 108.

As used herein, the core network 108 can comprise the "back-end" of the cellular communications network. Thus, the core network 108 can include multiple servers, routers, and other components such as, for example, Third Generation Partnership Program Authentication, Authorization and Accounting (3GPP AAA), proxy-call session control function (P-CSCF), interrogating-call session control function (I-CSCF), etc. Thus, the core network 108 is responsible for routing calls from one user equipment (UE) 110 to another UE, from the Internet to UEs 110, etc. The core network 108 is also responsible for roaming, billing, and other functions needed for the cellular network to function.

The UEs 110 can comprise a variety of electronic devices capable of one or more types of wireless communication (e.g., cellular, Wi-Fi, Bluetooth®, etc.). The UEs 110 can comprise, for example, cell phones, smart phones, tablet computers, laptops, desktops, smart watches, and other electronic devices. In this case, the UEs 110 can enable users to stream video and/or audio content from various content providers via the content-provider servers 104.

Conventionally, when a single UE 110 requests content, the content would be downloaded from a content-provider server 104 to components on the core network 108, distributed to the appropriate WBS 106, and then sent to the UE 110 requesting the content. This end-to-end, or unicast, type of transmission, however, requires one-to-one wireless bandwidth. In other words, the content is sent wirelessly only to the UE 110 requesting the content, rather than being broadcast to multiple UE 110 at the same time in a single broadcast transmission.

Cellular, and other wireless communications providers, have vast amounts of useful data about their users, however, that can enable relatively good predictions to be made about user's future consumption. A user who downloads every new episode of a particular TV show on the day it is released, for example, is likely to continue to do so for the next episode. Similarly, a user who has binge watched the first eight episodes of a particular show in the last four days is likely to download the last four episodes in the next two days. This information can be used by the system 100 to predict future behavior, enabling more content to be broadcast wirelessly to multiple UEs 110 than in previous systems.

To this end, as discussed below, the content-management server 102 can include one or more algorithms that attempt to predict future behavior for users connected to the system 100 to enable content to be broadcast to multiple UEs 110 at the same time. This can be done across the entire system 100, for example, or on a WBS 106 by WBS 106 basis. This process can also be triggered by one or more users requesting a particular content, for example, or can be done proactively based on user's previous behavior, at night when the core network 108 is relatively idle, or other times.

Thus, if a user requests content on a UE 110 via the WBS 106, the content-management server 102 and the WBS 106 can exchange capabilities and willingness to receive and broadcast content. Thus, each WBS 106 can provide an IP address to the content-management server 102, for example. In one form, WBSs 106 may also provide performance requirements (e.g., bandwidth limits, file formats, etc.) to enable the content-management server 102 to send the appropriate content. Thus, WBSs 106 with limited bandwidth capabilities due to technical limitations, high traffic, or poor conditions may receive lower resolution video, for example, and vice-versa. Of course, in some examples, as discussed below, the system 100 may wait until network usage is relatively low, obviating this consideration to a large extent.

If there is more than one WBS 106 in communication with users that are like to download the same content, the content-management server 102 can compile a list of WBSs 106 receiving the unicast packets. The list can include various specifications for each of the WBSs 106 including, for example, the distance from the content-management server 102 to the WBS 106, any network induced latency, bandwidth restraints, etc. In some examples, since the content may be sent at a later time, however, some or all of these specifications may be unnecessary. When downloading, however, some WBSs 106 may nonetheless receive 4K video, while other receive 1080p, 720p, or 480p video depending on technical and/or bandwidth limitations of each WBS 106.

In some examples, the content-management server 102 can be responsible for replicating the data packets for unicast to each WBS 106. This shifts the burden from the core network 108 to the dedicated content-management server 102. In addition, the content-management server 102 can be responsible for determining when the content is sent to the WBSs 106 and when the content is broadcast to the UEs 110.

Upon receipt of the data packet, the WBSs 106 can then broadcast the data packet to at least the first UE 110 that requested the content. In some examples, the WBS 106 can also send the content to each additional UE 110 identified as being likely to download the content. In other examples, the WBS 106 can send the content to the first UE 110 when requested, but wait to send the data to the additional UEs 110 identified as being likely to download the content at a later time (e.g., overnight).

Figure 2A:
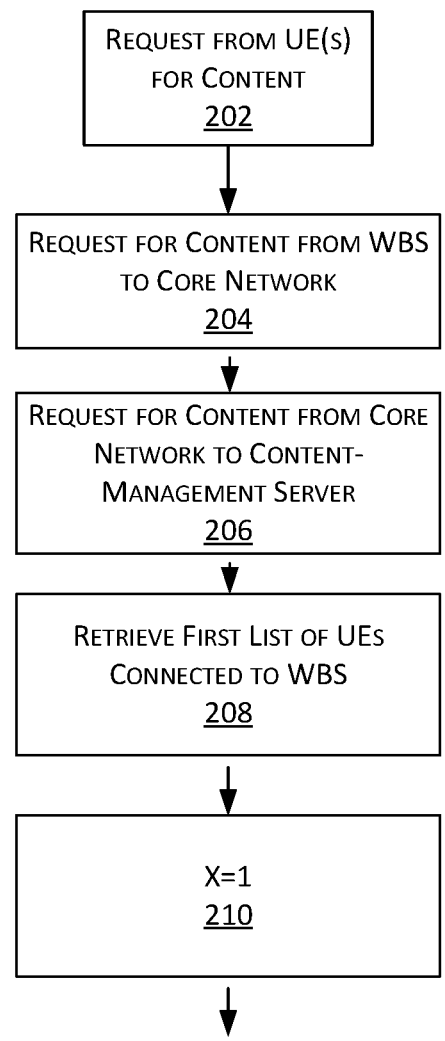
FIGS. 2A and 2B are flowcharts depicting an example of a method for identifying additional UEs connected to a wireless base station (WBS) that are likely to download requested content, in accordance with some examples of the present disclosure.
Figure 2B:
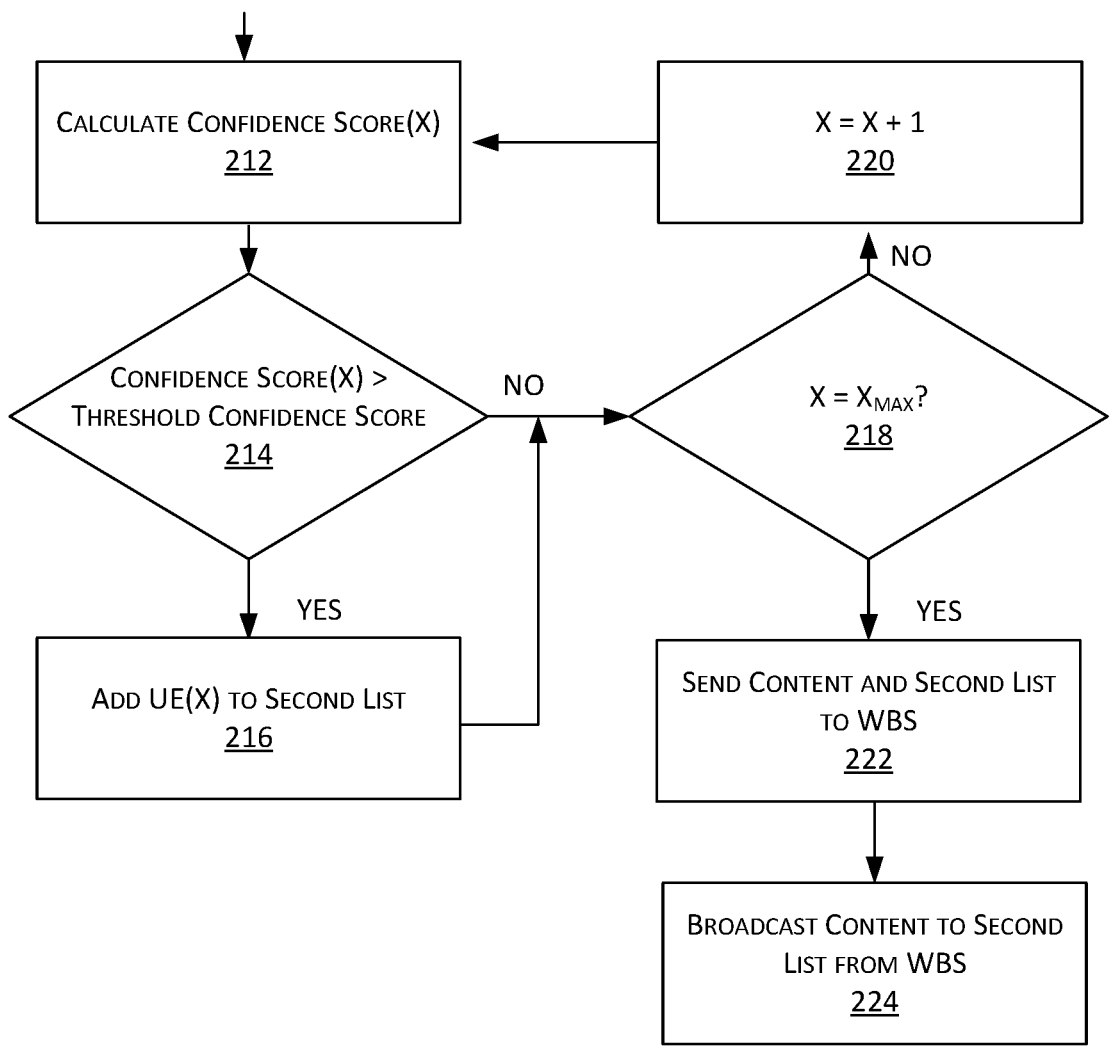

As shown in FIG. 2, examples of the present disclosure can also comprise a method 200 for predicting and providing content to UEs 110 using broadcast on the wireless side—i.e., from the WBSs 106 to the UEs 110—to reduce bandwidth consumption. As mentioned above, the method 200 can use data known by network providers (e.g., cellular carriers), browser histories, and/or a dedicated application on users' UEs 110 to obtain data about user's previous behavior to predict future behavior. Content can then be downloaded proactively to users—particularly users who have not yet requested the content—to enable the content to be broadcast wirelessly to multiple UEs 110. This may also enable content to be downloaded at off-peak times (e.g., overnight between 2 AM-6 AM) when bandwidth is more readily available on the system 100.

At 202, in some examples, the method 200 can begin with at least one UE 110 requesting content from a content-provider server 104 via a WBS 106. Obviously, if only one UE 110 is requesting content from a particular WBS 106, then that UE 110 can be served using traditional end-to-end unicast transmission—i.e., no bandwidth savings are realized by broadcasting to a single UE 110. Thus, it would be useful to identify other UEs 110 attached to that WBS 106 that are likely to download the same content.

At 204, the WBS 106 can send the request for content to the core network 108. The request can include, for example, an IP address, website, or other relevant information for the applicable content-provider server 104 and similar information for the WBS 106. The request can also include information regarding the content requested. The content can comprise, for example, streaming from a particular channel, a podcast, or a sporting event, among other things. In some examples, the request can simply comprise a hyperlink or a SIP message with the relevant information for the content and the WBS 106.

In some examples, the request can also include information about the UE 110 and indirectly, the user. The request can include, for example, other recent downloads, favorites and history from a web browser on the UE 110, the user's IP address, etc. This information can enable the content-management server 102 to maintain a profile for each user regarding past behavior for future use.

At 206, rather than going straight to the content-provider server(s) 104, therefore, the core network 108 can send the request to the content-management server 102. This enables the content-management server 102 to maintain the profile for each user. This also enables the content-management server 102 to potentially identify additional UEs 110 for the content requested by the UE 110 (discussed below). The content-management server 102 can also move the demands of downloading, replicating, and disseminating the content from the core network 108 to the content-management server 102, reducing load on other core network 108 components.

At 208, the content-management server 102 can retrieve (or be sent) a first list of UEs 110 connected to the WBS 106. The first list can be obtained from the WBS 106 itself, or a component of the core network 108 (e.g., a mobile management entity, or MME), as appropriate. In some examples, the first list can merely include an IP address, phone number, or another relevant identifier for each user connected to the WBS 106. Thus, the content-management server 102 can receive the first list, retrieve the profile for each UE 110, and then add appropriate UEs 110 to the content request. In other words, UEs 110 that are determined to have a high confidence score with the respect to the content in the request can be added to the list of UEs 110 to receive the content, and vice-versa.

In other examples, user profiles can be stored on another component of the core network 108, such as a policy and charging rules function (PCRF), discussed below with reference to FIG. 6. In this configuration, the first list itself can include user history and other data for some, or all, of the UEs 110 attached to the WBS 106. In other examples, the content-management server 102 can query the core network 108 for user history, statistics, and other information for the users (or rather, the UEs 110) upon receiving the first list. This can include a list of websites, for example, content that has been downloaded to each UE 110, keywords associated with the content, and other data useful to predict likely future behavior for each user.

At 210, a counter, X, can be set to 1 (X=1) to begin the review process for all UEs 110 connected to the WBS 106. At 212, the content-management server 102 can calculate a confidence score for each UE 110, in this case UE(1) 110, related to how confident the system 100 is that the user will download the content requested in the near future. This can be done using various machine learning algorithms such as, for example, linear regression, logistic regression, decision tree, support vector machine (SVM), Naive Bayes, K-nearest neighbors (KNN), K-means, random forest, dimensional reduction algorithms, etc. As mentioned above, a user that has downloaded the first 26 episodes of a particular show, for example, is highly likely to download the $27^{th}$ episode. A user that downloaded the first episode of the same show three weeks ago and then never downloaded the second episode, is significantly less likely to download the $27^{th}$ episode anytime in the near future.

In some examples, the confidence score can also be related to other factors such as, for example, the size of the file, the available memory on a particular UE 110, network loading, etc. Thus, the required confidence score for a 4 GB file may be higher than for a 100 MB file. As mentioned above, in some examples, the cache provided on each UE 110 can be on a FIFO basis. To this end, in some examples, the confidence score required for a UE 110 with a full cache—where downloading the file may require deleting an existing file—may be higher than that for a UE 110 with a relatively empty cache.

In addition, the confidence score can be affected by various marketing tools. If for example, a user is a regular consumer of motorsports programming, for example, the content-management server 102 may increase the confidence score for a first race (e.g., Formula 1) when compared to a second race (e.g., NASCAR), for example, because the promoters of Formula 1 have paid a promotional fee to the carrier to "push" their content, while the NASCAR promoters have not. Thus, while the user may not have previously watched Formula 1, they may be encouraged to do so simply because it is already downloaded to the UE 110. In this manner, when this content is selected, playback starts immediately (e.g., no buffer), performance during the race is improved (e.g., no buffer, no jitter, etc.), and the race is even available offline, so no network connection is required.

At 214, the content-management server 102 can determine if the confidence score for UE(1) is above a pre-determined threshold. As mentioned above, in some examples, the pre-determined threshold can be the same for all users. In this configuration, all users for whom the confidence score is above the predetermined threshold (e.g., 70, 80, or 90% confidence) can be slotted to receive the content. In other examples, the confidence score for each user can be evaluated separately based on the available cache, file size, history, etc., with the predetermined threshold set individually for each user based on these factors. In other words, UE(1) 110 with an 80% free cache may be set to 60% confidence, for example, while UE(2) 110 with an 80% full cache may be set to 85% confidence.

At 216, regardless of the methodology, if the confidence score for UE(1) 110 is above a predetermined threshold (e.g., 70%, 80%, or 90%), the content-management server 102 can add UE(1) to a second list of UEs 110 to which the content is to be broadcast. Any UE 110 that is above the predetermined threshold can be added to the second list as being sufficiently likely to download the content at some point in the near future.

At 218, those UEs 110 that are below the predetermined threshold are not added to the list and the content-management server 102 can determine if all UEs 110 connected to a particular WBS 106 have been evaluated, or if $X=X_{MAX}$. At 220, if not, the counter, X can be incremented by one to evaluate the next UE 110, UE(2) 110, on the first list until all UEs 110 have been evaluated.

At 222, once all, or a subset, of the UEs 110 on the first list have been evaluated, the content-management server 102 can send (1) the content and (2) the second list to the WBS 106. The second list can include the IP address, International Mobile Subscriber Identification (IMSI), phone number, or other suitable identification for each UE 110 that should receive the content. The second list may also include at least two tranches—one tranche of UEs 110 for which playback should start immediately and one tranche of UEs 110 for which the content should be cached for later playback. This can be indicated to the UEs 110 using a SIP message, for example, or can be managed by an application ("app") on the UEs 110, discussed below.

At 224, the WBS 106 can send the content to all of the UEs 110 on the second list in a single broadcast transmission. In this manner, the content is sent from the WBS 106 to the UEs 110 using a fraction of the wireless bandwidth when compared to sending the content to each UE 110 individually, or unicast. Thus, sending a 4 GB file (e.g., a high-definition movie) to 100 UEs 110 at the same time, for example, saves approximately 396 GB of wireless bandwidth. This efficiency, replicated for hundreds or thousands of files and hundreds or thousands of UEs 110 represents multiple terabytes (TB) every day in wireless bandwidth savings.

In this case, because the method 200 was initiated by a user requesting the content, at least one UE 110 on the list will be included in the immediate playback tranche. In other examples, however, the method 200 could be started by some other trigger. The content-management server 102 could run various algorithms at night (e.g., 3 AM), for example, when wireless traffic is low.

The content-management server 102 could identify the current top five most downloaded TV shows, for example, identify users who have a high confidence of downloading those shows in the near future, and automatically download the show to all such UEs 110 connected to one or more WBSs 106. In this manner, the wireless bandwidth required to download the content to hundreds or thousands of users is reduced by a factor of hundreds or thousands, respectively. In addition, network demand during peak times—i.e., the time when many of the users may choose to download the content the next day—is reduced significantly because the content was downloaded to the UEs 110 overnight and cached.

In addition, network and playback performance for all users is improved. In other words, playback performance is improved for users watching a video, for example, because the video has been downloaded to the UE 110 instead of being streamed. This lessens the need for high-speed connections required to stream video, and reduces or eliminates buffer, jitter, and other performance demands on the system 100. In addition, because large amounts of data can be downloaded at off-peak times, network performance during peak times is improved for all users.

As mentioned above, the method 200 could also be used to push content to users for content providers that pay promotional fees, for example, or provide discounts to the carrier. Thus, the method 200 can be used to identify users that, while they have not specifically requested the content, are fairly likely to download the content anyway (e.g., it is in a category they often download). In this configuration, the predetermined confidence score can be adjusted according to the arrangement between the carrier and the content provider; for example, and can be the same or different than the carrier's "internal" confidence score, discussed above.

Figure 3A:
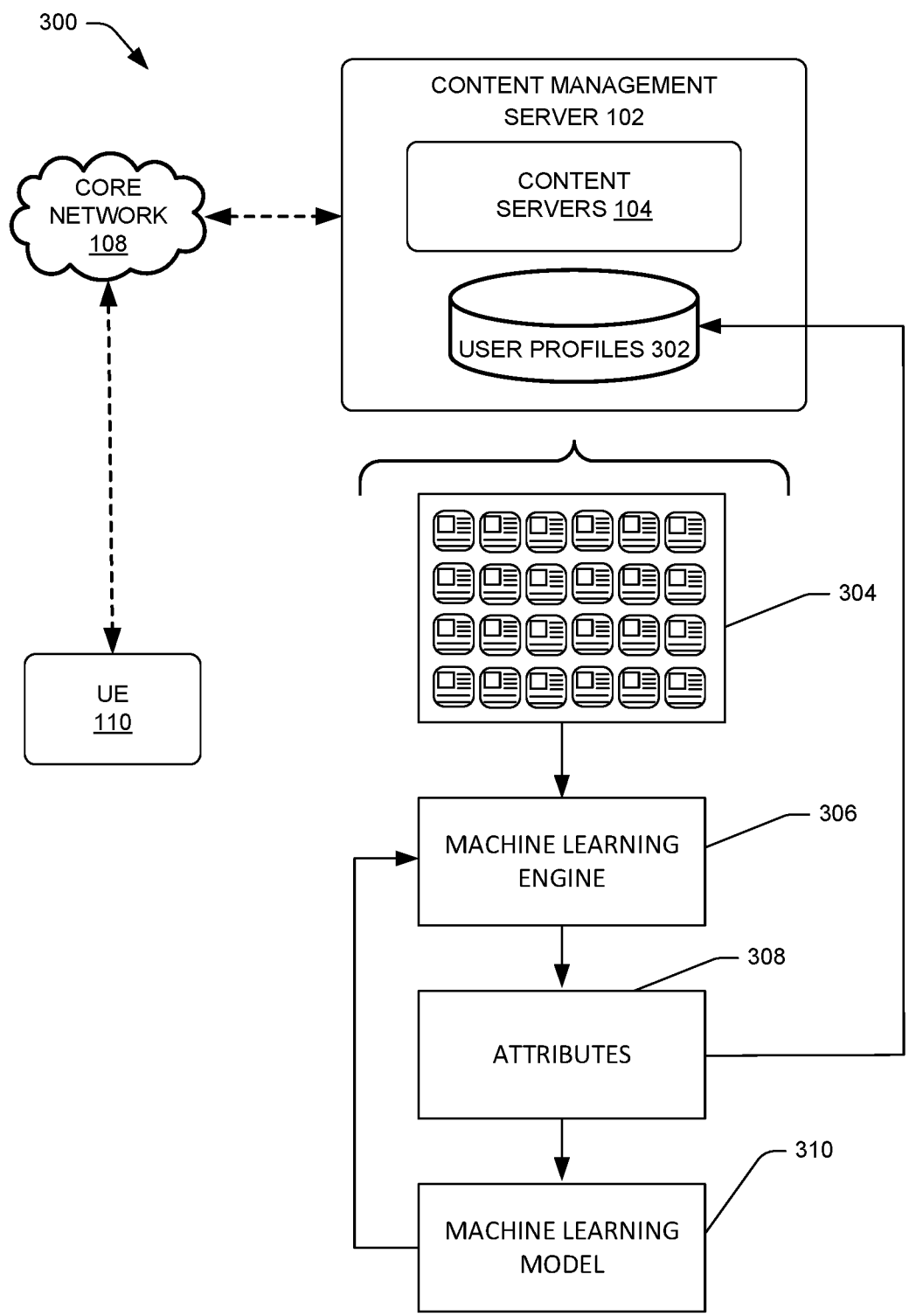
FIG. 3A depicts a machine learning engine creating a machine learning model for identifying users, in accordance with some examples of the present disclosure.
Figure 3B:
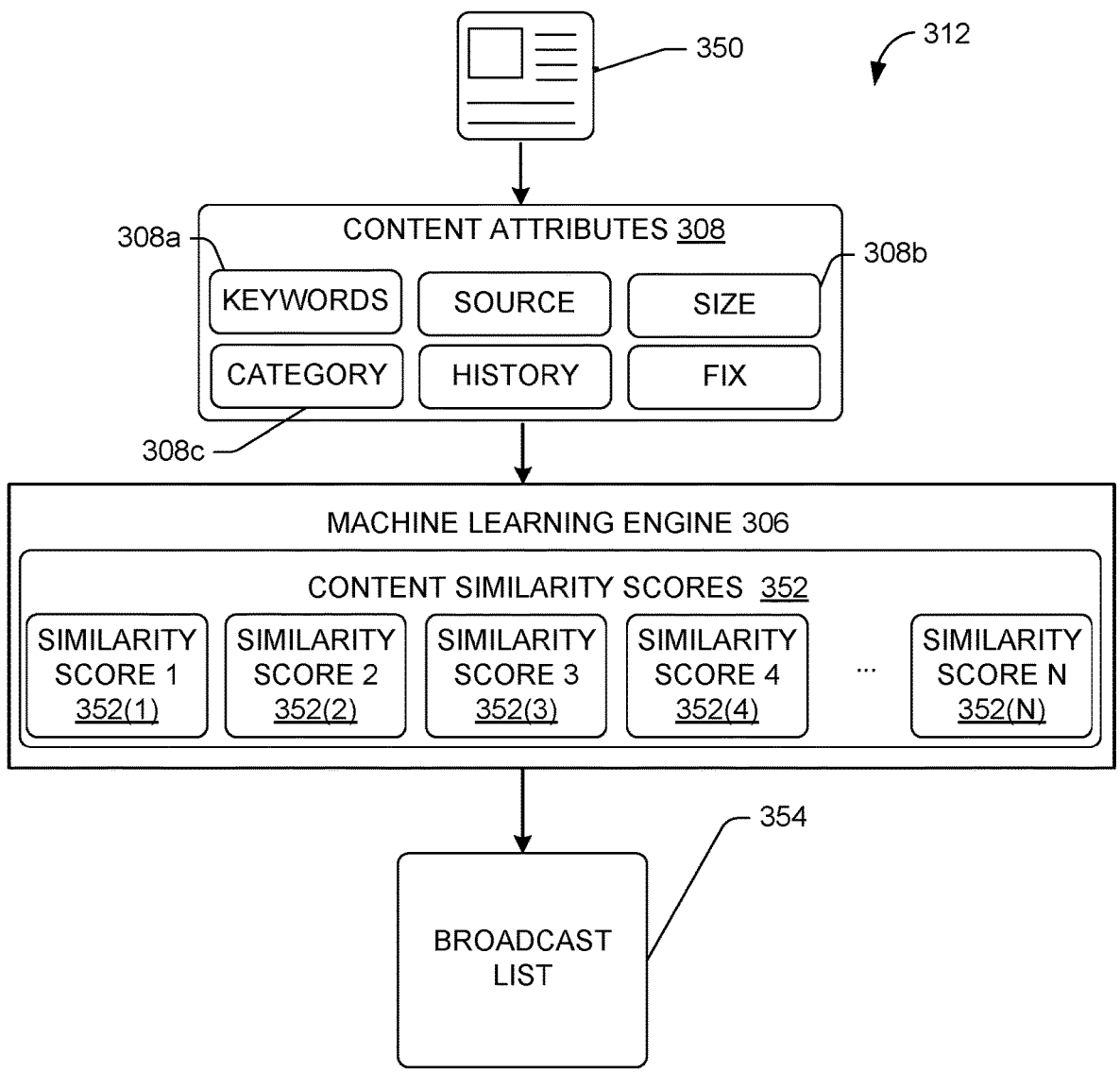
FIG. 3B depicts a machine learning engine assigning a similarity score comparing a requested content to a user's content history, in accordance with some examples of the present disclosure.

As shown in FIGS. 3A and 3B, in some examples, the system 100 can use a machine learning system 300 to evaluate user's potential content consumption. In other words, based on user's past selections, and other variables, the system 300 can attempt to predict user's preferences. Based on these assumptions, the system 100 can then proactively download content to relevant users to reduce wireless bandwidth consumption.

As discussed above, users can connect to the core network 108 via UEs 110, which can comprise cell phones, smart phones, tablets, and other electronic devices. The UEs 110 can receive content from content-provider servers 104 via the content-management server 102. As a result, the content-management server 102 can compile and maintain a user profile user profile database 302 of user profiles. The user profile user profile database 302 can include previous content that the user has downloaded, the website, or other content provider, from which the content was downloaded, current cache levels on the UEs 110, and other relevant information.

For a particular user, therefore, the user profile database 302 can include a content history 304. Thus, information regarding TV shows, podcasts, You Tube videos and other content 304*a* previously downloaded to the UE 110, and theoretically watched or listened to by the user, can be included in the user profile user profile database 302. The content history 304 can then be provided to a machine learning engine 306 where various attributes 308 for each entry in the content history 304 can be determined. As discussed below, these attributes 308 can be related to the type of media, media categories, keywords, length, video quality, etc. The attributes 308 can enable the machine learning engine 306 to create a machine learning model 310, which can be used to calculate similarity scores for additional content 304*a*, as discussed below with reference to FIG. 3B.

In some examples, the attributes 308 can also be added to the user profile database 302 for future use. In this configuration, for each separate content 304*a* in the content history 304, the machine learning engine 306 need only extract the attributes 308 once. Indeed, in some examples, the attributes 308 need only be extracted once for each entry across all users. In other words, the attributes 308 for a particular piece of content 304*a* can be used for all users across a particular cellular carrier, for example, and stored in a common database.

As shown in FIG. 3B, a first content 350 can be analyzed for a plurality of particular user. This may be prompted by a number of actions. In some cases, a first user can request the first content 350 from the WBS 106 to which the user is connected. Rather than simply sending the first content 350 to the user separately (unicast), however, the system 300 can first determine if there are other users in communication with the same WBS 106 that are likely to download the same content.

In other examples, the system 300 may be activated at a predetermined time (e.g., 3 or 4 AM) or at a predetermined network utilization (e.g., less than 50 or 60%). In this manner, the first content 350 can be sent to multiple users in a broadcast conserving wireless bandwidth. In addition, the first content 350 can be sent at a time when core network 108 and wireless bandwidth utilization is low, improving overall network performance.

In this example, a user, user(1) has requested the first content 350. The system 300 can then use the previously created machine learning model 310 to determine if there may be other users connected to the WBS 106 that are likely to download the first content. To determine if a second user, e.g., user(2), is likely to download the first content 350, the system 300 can first extract one or more attributes 308 from the first content 350. The attributes 308 can include, for example, keywords 308*a*, file size 308*b*, categories 308*c* and other attributes 308. As the name implies, the keywords 308*a* can include words that describe the nature of the first content 350—i.e., snow skiing, downhill, world cup, etc.

Many users may not download large files (e.g., >100 MB or 1 GB) due to plan limitations, UE performance, network performance, or other issues. As a result, a user that never downloads files that are more than 100 MB, for example, may be annoyed to find out that his UE 110 has been automatically downloading a 4 GB file for the last 15 minutes. As a result, the file size 308*b* can be used to determine an upper limit, lower limit, or average range for user(1). In another form, the automatically downloaded content may not be counted against the plan limitation of user(1), until the moment when user(1) chooses to view the content.

The category 308*c* can be used as a high-level indicator of what the user generally downloads. To this end, the category 308*c* can be as broad as sports, news, and comedy. Or category 308*c* may be slightly more specific such as, for example, motorsports, soccer, or home improvement. Regardless, category 308*c* may be used as somewhat of a gatekeeper for the system 300. In other words, if user(1) has never downloaded content in that category 308*c*, assessing the rest of the attributes 308 may be unnecessary.

Of course, the number and actual value of attributes 308 can be different for different types of media. In other words, movies may have different attributes 308 than video games, video games may have different attributes 308 then podcasts, etc. As a result, more, less, and/or different attributes 308 than those shown in FIG. 3B can be used.

Once the attributes 308 for the first content 350 have been extracted, these attributes 308 can be provided to the machine learning engine 306 for comparison to the user profile database 302 (i.e., the content history 304) for user(1). Thus, the system 300 can calculate a similarity score 352 for the first content 350 in relation to the content history 304. In some examples, the first content 350 can be compared to each entry in the content history 304 to form an overall similarity score 352. In other examples, the system 300 can only compare the first content 350 to a subset of entries in the content history 304, such as content in the same category 308*c*, for example, or with at least one keyword 308*a* in common.

The machine learning engine 306 can then provide a similarity score 352(1) for the first content 350 for user(1). As discussed above with respect to FIGS. 2A and 2B, in some examples, only content with a similarity score 352 above a predetermined threshold will be automatically downloaded to user(1). In this manner, only content that is likely to be downloaded by user(1) will be sent automatically.

In some examples, the system 300 can then continue the calculate a similarity score 352(2)-352(N) for all, or a subset of, users in communication with the same WBS 106 to form a list of users who are likely to download the first content 350. The list 354 can include all users attached to a particular WBS 106 with a similarity score 352 above the predetermined threshold, for example, to enable the first content 350 to be broadcast simultaneously to all users on the list 354.

In some examples, factors external to the first content 350 can also be used to determine if a particular user should receive the first content 350. So, for example, if the cache on a particular UE 110 is full, or almost full, for example, the similarity score 352 for the first content 350 may be adjusted downward for that user. In this manner, because downloading the first content 350 may require deleting already downloaded content on the UE 110, only content with a sufficiently high similarity score 352 will be downloaded.

As an example, if a particular user's cache is full, the similarity score 352 for the first content 350 can be reduced by, for example, 10%. In this example, if the predetermined threshold for similarity scores 352 is 80%, then only content with an initial similarity score 352 above 90% will be downloaded to that user. In this manner, content that is "marginal" with respect to the threshold similarity score (e.g., between 80-90%) will be downloaded to users with relatively free caches and will not be downloaded to those UE 110 with relatively full caches.

Similar adjustments can also be made for UEs 110 that are approaching data plan limits. So, for example, if the first content 350 would put the UE 110 near, or over, the data plan limit for the UE 110, then the similarity score 352 for the first content 350 can be reduced accordingly. In some examples, the reduction in similarity score 352 can be increased as the UE 110 approaches the data limit—i.e., the closer the UE 110 is to the data limit, the larger the reduction. In some examples, the first content 350 is never downloaded when downloading it would put the UE 110 at, or within a predetermined threshold (e., above 80 or 90%) of the data limit.

In some examples, data downloaded by the system 100 does not account against data limits. In other words, because the content may be downloaded without the user's direct consent, the content can be downloaded for "free." This cost to the carrier is minimal and may be more than offset by savings associated with improved network performance, reduced system outages, maintenance, and upgrades, and the reduction in costs associated therewith.

Figure 4:
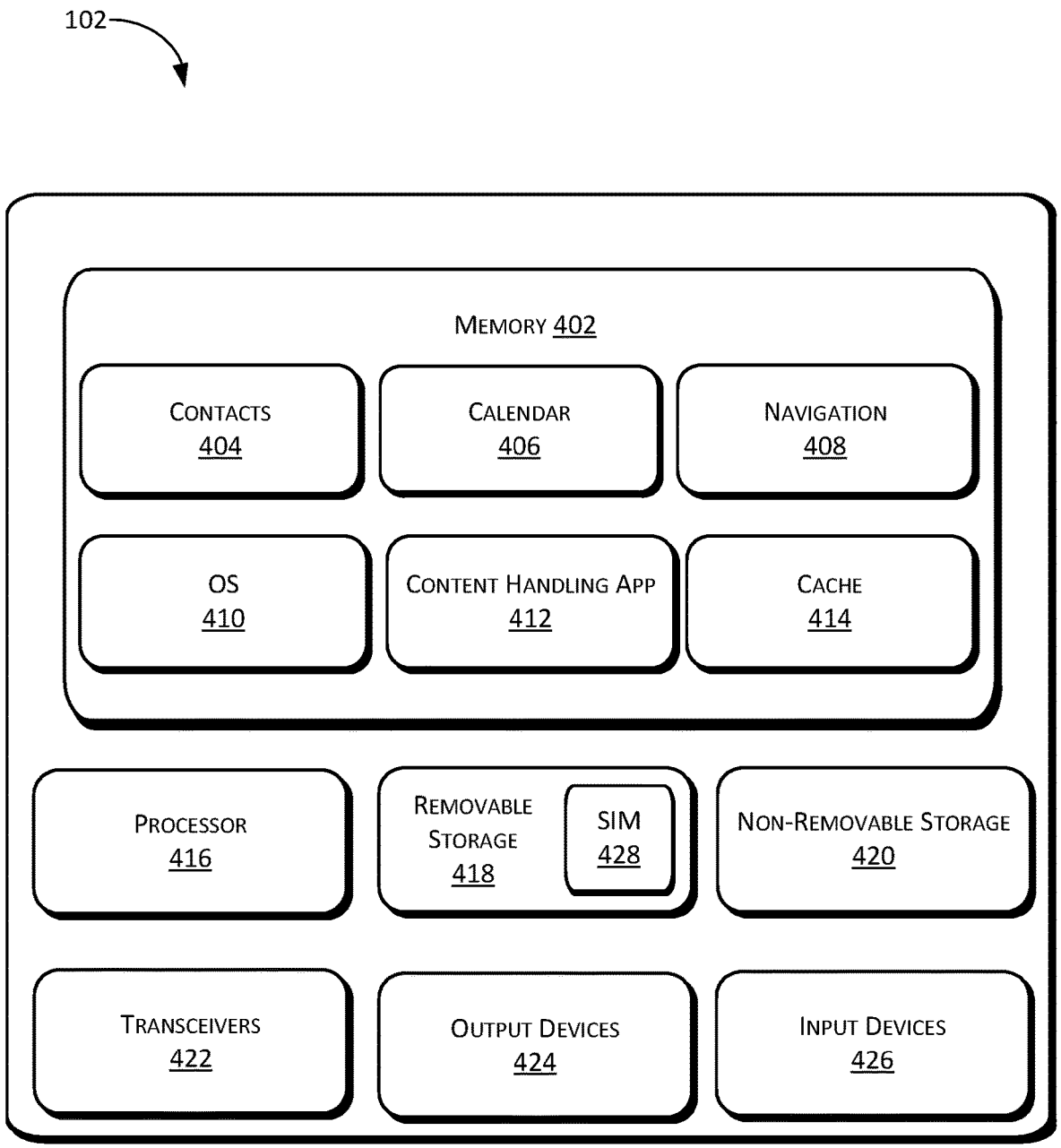
FIG. 4 is an example of a UE for use with the systems and methods disclosed herein, in accordance with some examples of the present disclosure.

As shown in FIG. 4, the systems 100, 300 and method 200 can be used in conjunction with a UE 110 that can comprise a variety of electronic devices. For clarity, the UE 110 is described herein generally as a cell phone or smart phone. One of skill in the art will recognize, however, that the systems 100, 300 and method 200 can also be used with a variety of other electronic devices, such as, for example, tablet computers, laptops, desktops, and other network (e.g., cellular or IP network) connected devices from which audio, video, and other content can be consumed. These devices are referred to collectively as UEs 110.

The UEs 110 can comprise a number of components to execute the above-mentioned functions. As discussed below, the UEs 110 can comprise memory 402 including many common features such as, for example, the contacts 404, calendar 406, navigation software 408, and the operating system (OS) 410. In this case, the memory 402 can also include, for example, a content-handling application ("app") 412 and the content cache 414.

The UEs 110 can also comprise one or more processors 416. In some implementations, the processor(s) 416 can be a central processing unit (CPU), a graphics processing unit (GPU), or both CPU and GPU, or any other sort of processing unit. The UEs 110 can also include one or more of removable storage 418, non-removable storage 420, transceiver(s) 422, output device(s) 424, and input device(s) 426. In some examples, such as for cellular communication devices, the UEs 110 can also include a subscriber identification module (SIM) 428 including an International Mobile Subscriber Identity (IMSI), and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408, 412, 414 and the OS 410 for the UEs 110, among other things.

The memory 402 can also comprise contacts 404, which can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The memory 402 can also include the OS 410. Of course, the OS 410 varies depending on the manufacturer of the UE 110 and currently comprises, for example, iOS 10.3.2 for Apple products and Oreo for Android products. The OS 410 contains the modules and software that supports a computer's basic functions, such as scheduling tasks, executing applications, and controlling peripherals.

In some example, the UE 110 can include a content-handling app 412 for managing the content at the UE 110 level. Thus, while the UE 110 may have substantially the same information as the core network 108 regarding usage history, browser history, and other details regarding the user's past consumption, the UE 110 can also include the content-handling app 412 that includes additional information and provides additional management and control over the content cache 414 on the UE 110.

In some examples, the content-handling app 412 can include additional information that can be used to manage the content cache 414 on the UE 110. Since much of the content may be downloaded automatically to the UE 110 and may also be consumed offline, some information is not necessarily readily available to the core network 108. If the content-management server 102 consistently downloads a program to a UE 110, but the user consistently deletes the content, this information can be saved and used by the content-handling app 412 to send a message (e.g., a SIP message) to stop downloading this content. Similarly, the content-handling app 412 can enable the user to set certain content to "delete when cache is full" or "keep until deleted" to prevent content from being automatically deleted by the system 100.

Similarly, in some configurations, the core network 108 or the content-management server 102 may be unaware of the current status of the content cache 414 on the UE 110. To this end, the content-handling app 412 can provide intermittent updates to the core network 108 or the content-management server 102, or can simply refuse downloads at a predetermined level. Thus, if the content cache 414 is sufficiently full (e.g., 80 or 90%), the content-handling app 412 can send a message to stop downloading to the core network 108 or the content-management server 102 until further notice.

The content-handling app 412 can manage the content cache 414 in multiple ways. In some examples, the content-handling app 412 can simply refuse downloads as they arrive at the UE 110 when the content cache 414 is sufficiently full (e.g., 90 or 95%). Thus, while content may be received at the transceiver(s) 422 via a broadcast from the WBS 106, the content-handling app 412 can simply not save the content to the content cache 414 or can delete the content (e.g., from a temporary file) as it arrives. In still other examples, with the exception of content that has been marked by the user as "do not delete," as discussed above, the content-handling app 412 can simply handle content on a FIFO basis. In this configuration, as new content is downloaded that exceeds the available space in the content cache 414, the oldest file(s) can be deleted to make room.

In some examples, the content cache 414 can be installed as a folder or directory location in the memory 402 as part of, or with, the content-handling app 412. In other examples, the content cache 414 can comprise a separate partition in the memory 402 (e.g., a partition on a solid-state drive (SSD)) and can be hidden or visible. In some examples, the content cache 414 can be a hidden partition to enable the cellular carrier, content providers, etc. with access to the system 100. Carriers may sell UEs 110 with 64 GB of memory 102 as UEs 110 with 32 GB of memory, for example, to provide the carrier with a guaranteed 32 GB if content cache 414. In this manner, the user does not feel their memory is being used up by the system 100.

In other examples, the user can set the size of the content cache 414. Users that consume a lot of media, for example, can set the content cache 414 to a relatively large size. In systems where the carrier does not count data downloaded with the system 100 towards the user's limits, for example, the user can actually use the content cache 414 to save money by reducing data overages. Similarly, users that prefer to use the memory 402 for pictures or music, for example, can set the content cache 414 to a relatively small size to minimize the impact on available memory 402.

The UEs 110 may also include additional data storage devices (removable and/or non-removable) such as, for example, magnetic disks, optical disks, or tape. Such additional storage is illustrated in FIG. 4 by removable storage 418 and non-removable storage 420. The removable storage 418 and non-removable storage 420 can store some, or all, of the functions 404, 406, 408 and/or OS 410.

Non-transitory computer-readable media may include volatile and nonvolatile, removable and non-removable tangible, physical media implemented in technology for storage of information, such as computer readable instructions, data structures, program modules, or other data. The memory 402, removable storage 418, and non-removable storage 420 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 110. Any such non-transitory computer-readable media may be part of the UEs 110 or may be a separate database, databank, remote server, or cloud-based server.

In some implementations, the transceiver(s) 422 include any sort of transceivers known in the art. In some examples, the transceiver(s) 422 can include wireless modem(s) to facilitate wireless connectivity with the other UEs, the Internet, and/or an intranet via a cellular connection. Further, the transceiver(s) 422 may include a radio transceiver that performs the function of transmitting and receiving radio frequency communications via an antenna (e.g., Wi-Fi or Bluetooth®). In other examples, the transceiver(s) 422 may include wired communication components, such as a wired modem or Ethernet port, for communicating with the other UEs or the provider's Internet-based network.

In some implementations, the output device(s) 424 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 110 is connected to a network, the type of call being received (e.g., video calls vs. voice calls), the number of active calls, etc. Output device(s) 424 also include ports for one or more peripheral devices, such as headphones, peripheral speakers, or a peripheral display.

In various implementations, input device(s) 426 include any sort of input devices known in the art. For example, the input device(s) 426 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
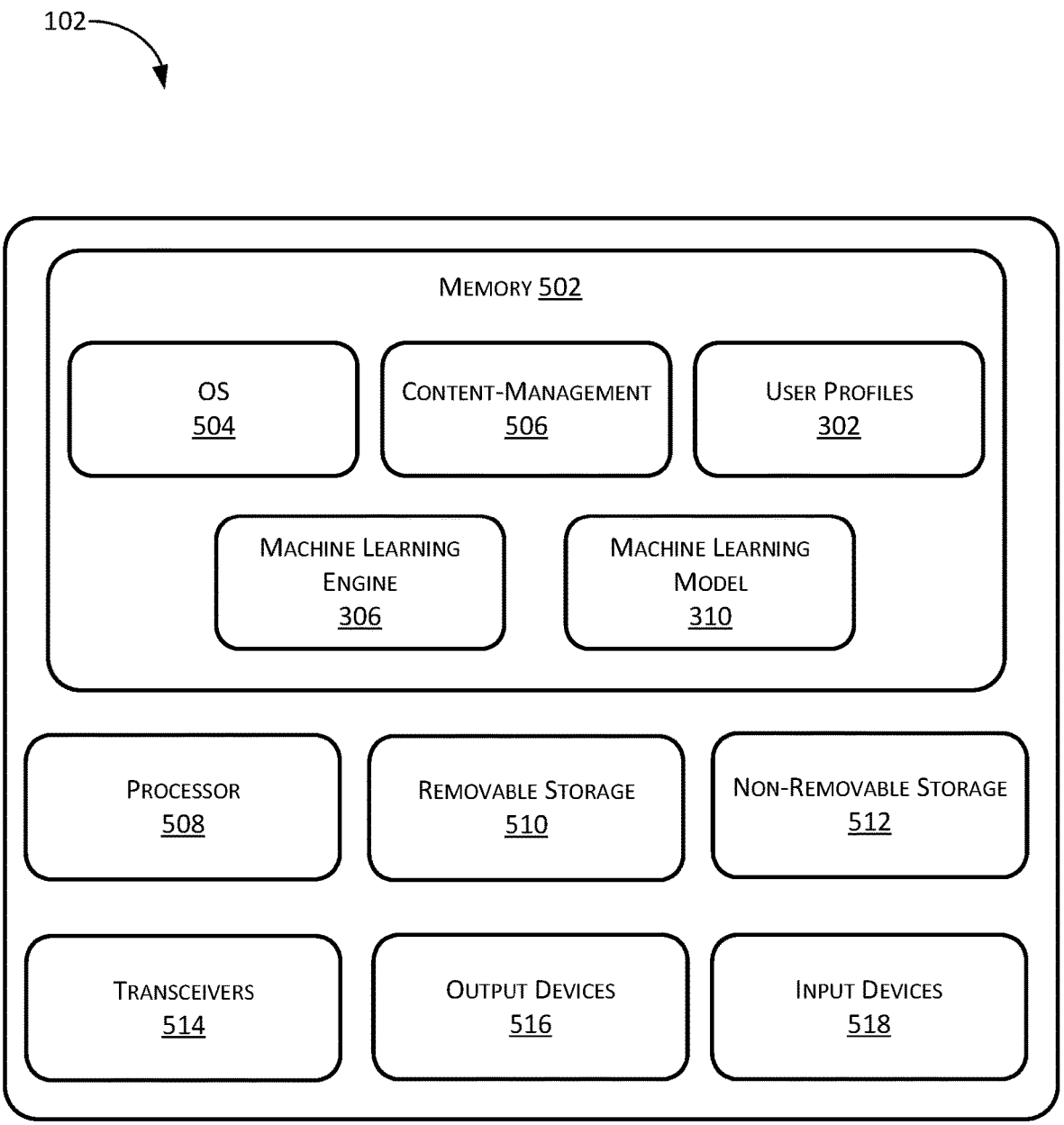
FIG. 5 is an example of a content-management server for use with the systems and methods disclosed herein, in accordance with some examples of the present disclosure.

As shown in FIG. 5, the systems 100, 300 and method 200 can also be used in conjunction with the content-management server 102, which can comprise a variety of electronic devices. As mentioned above, the content-management server 102 can comprise a supplementary server as part of the core network 108, or can be a standalone server for use with the systems 100, 300 and method 200 discussed herein. The content-management server 102 can comprise, for example, a dedicated server, desktop, laptop, tablet, or another type of computing device.

The content-management server 102 can comprise a number of components to execute the above-mentioned functions and apps. As discussed below, the content-management server 102 can comprise memory 502 including many common features such as, for example, the OS 504, the content-management algorithm 506, user profile database 302, the machine learning engine 306, and the machine learning model 310.

The content-management server 102 can also comprise one or more processors 508. In some implementations, the processor(s) 508 can be a central processing unit (CPU), a graphics processing unit (GPU), or both CPU and GPU, or any other sort of processing unit. The content-management server 102 can also include one or more of removable storage 510, non-removable storage 512, transceiver(s) 514, output device(s) 516, and input device(s) 518.

In various implementations, the memory 502 can be volatile (such as random access memory (RAM)), non-volatile (such as read only memory (ROM), flash memory, etc.), or some combination of the two. The memory 502 can include all, or part, of the functions 506, 302, 306, 310 for the content-management server 102, among other things. The memory 502 can also include the OS 504. Of course, the OS 504 varies depending on the manufacturer of the content-management server 102 and the type of component. Many servers, for example, run Linux or Windows Server. Dedicated cellular routing servers may run specific telecommunications OSs 504. The OS 504 contains the modules and software that supports a computer's basic functions, such as scheduling tasks, executing applications, and controlling peripherals.

In some examples, depending in the server's function, the content-management server 102 can also comprise a content-management algorithm 506. The content-management algorithm 506 can enable the content-management server 102 to receive the requests for content from the WBSs 106, compile a list of users likely to download the content, and transmit the content and list to the WBSs 106. As mentioned above, the content-management algorithm 506 can enable the content to be sent to the WBSs 106 along with the list for broadcast to all users on the list simultaneously. In this manner, the wireless bandwidth used by the WBS 106 to transmit the content to multiple users is greatly reduced. As shown, the memory 502 can also include the user profile database 302, machine learning engine 306, and machine learning model 310, which are discussed above in detail.

The content-management server 102 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the OS 504 and functions 506, 302, 306, 310.

Non-transitory computer-readable media may include volatile and nonvolatile, removable and non-removable tangible, physical media implemented in technology for storage of information, such as computer readable instructions, data structures, program modules, or other data. The memory 502, removable storage 510, and non-removable storage 512 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the content-management server 102. Any such non-transitory computer-readable media may be part of the content-management server 102 or may be a separate database, databank, remote server, or cloud-based server.

In some implementations, the transceiver(s) 514 include any sort of transceivers known in the art. In some examples, the transceiver(s) 514 can include wireless modem(s) to facilitate wireless connectivity with the other UEs, the Internet, and/or an intranet via a cellular connection. Further, the transceiver(s) 514 may include a radio transceiver that performs the function of transmitting and receiving radio frequency communications via an antenna (e.g., Wi-Fi or Bluetooth®). In other examples, the transceiver(s) 514 may include wired communication components, such as a wired modem or Ethernet port, for communicating with the other UEs or the provider's Internet-based network.

In some implementations, the output device(s) 516 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the content-management server 102 is connected to a network, the type of call being received (e.g., video calls vs. voice calls), the number of active calls, etc. Output device(s) 516 also include ports for one or more peripheral devices, such as headphones, peripheral speakers, or a peripheral display.

In various implementations, input device(s) 518 include any sort of input devices known in the art. For example, the input device(s) 518 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

FIG. 6 depicts a conventional cellular network 600 including 2G 602, 3G 604, and 4G long-term evolution (LTE) 606 components. Of course, future technologies, such as, for example, 6G, Internet of Things (IoT), and device-to-device (D2D) components could also be included and are contemplated herein. As mentioned above, many of the "back-end" components of the network 600 currently handle some, or all, of the replication and routing for content. Indeed, some, or all, of the aforementioned content-management algorithm 506, machine learning engine 306, etc. could be located on one or more of, for example, the HLR/HSS 622, the 3GPP AAA server 626, or other components. In other words, the content-management server 102 can be standalone or can be integrated into one of the existing network components.

As is known in the art, data can be routed from the Internet or other sources using a circuit switched modem connection (or non-3GPP connection) 608, which provides relatively low data rates, or via IP based packet switched 610 connections, which results is higher bandwidth. The LTE system 606, which is purely IP based, essentially "flattens" the architecture, with data going straight from the internet to the service architecture evolution gateway (SAE GW) 612 to evolved Node B transceivers 606, enabling higher throughput. Many UEs 110 also have wireless local area network (WLAN) 614 capabilities, in some cases enabling even higher throughput. In some cases, cellular carriers may use WLAN communications in addition to, or instead of, cellular communications to supplement bandwidth.

The serving GPRS support node (SGSN) 616 is a main component of the general packet radio service (GPRS) network, which handles all packet switched data within the network 600—e.g. the mobility management and authentication of the users. The MSC 618 essentially performs the same functions as the SGSN 616 for voice traffic. The MSC 618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 618 sets up and releases the end-to-end connection, handles mobility and hand-over requirements during the call, and takes care of charging and real time pre-paid account monitoring.

Similarly, the mobility management entity (MME) 620 is the key control-node for the 4G LTE network 606. It is responsible for idle mode UE 110 paging and tagging procedures including retransmissions. The MME 620 is involved in the bearer activation/deactivation process and is also responsible for choosing the SAE GW 612 for the UE 110 at the initial attach and at time of intra-LTE handover involving Core Network (CN) node relocation (i.e., switching from one cell site to the next when traveling). The MME 620 is responsible for authenticating the user (by interacting with the HSS 622 discussed below). The Non-Access Stratum (NAS) signaling terminates at the MME 620 and it is also responsible for generation and allocation of temporary identities to UE 110. The MME 620 also checks the authorization of the UE 110 to camp on the service provider's HPLMN or VPLMN and enforces UE 110 roaming restrictions on the VPLMN. The MME 620 is the termination point in the network for ciphering/integrity protection for NAS signaling and handles the security key management. The MME 620 also provides the control plane function for mobility between LTE 606 and 2G 602/3G 604 access networks with the S3 interface terminating at the MME 620 from the SGSN 616. The MME 620 also terminates the S6a interface towards the home HSS 622 for roaming UEs 110.

The HSS/HLR 622 is a central database that contains user-related and subscription-related information. The functions of the HSS/HLR 622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules function (PCRF) 624 is a software node that determines policy rules in the network 600. The PCRF 624 is generally operates at the network core and accesses subscriber databases (e.g., the HSS/HLR 622) and other specialized functions, such as content handling (e.g., whether the user has sufficient data left in their plan), in a centralized manner. The PCRF 624 is the main part of the network 600 that aggregates information to and from the network 600 and other sources (e.g., IP networks 610). The PCRF 624 can support the creation of rules and then can automatically make policy decisions for each subscriber active on the network 600. The PCRF 624 can also be integrated with different platforms like billing, rating, charging, and subscriber database or can also be deployed as a standalone entity.

Finally, the 3GPP AAA server 626 performs authentication, authorization, and accounting (AAA) functions and may also act as an AAA proxy server. For WLAN 614 access to (3GPP) IP networks 610 the 3GPP AAA Server 626 provides authorization, policy enforcement, and routing information to various WLAN components. The 3GPP AAA Server 626 can generate and report charging/accounting information, performs offline charging control for the WLAN 614, and perform various protocol conversions when necessary.

As shown, in some examples, the 3GPP AAA server 626 can contain some, or all, of the components of the system 100. In some examples, the 3GPP AAA Server 626 can include, for example, the content-management algorithm 506, the user profile database 302, the machine learning engine 306, and other functions. Of course, as mentioned above, other components (e.g., the HSS/HLR 622) could also include some, or all, of the system 100.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the content-management server 102 and/or various components on the cellular network 600, other components could perform the same or similar functions without departing from the spirit of the invention.

The specific configurations, connections, and network routing can be varied according to particular design specifications or constraints requiring a UE 110, content-management server 102, system 100, or method 200, 300 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
    receiving, at a transceiver of a wireless base station (WBS), a request from a first user equipment (UE) for a first content;
    transmitting, from the transceiver of the WBS to a transceiver of a content-management server, the request for the first content and a first list including a first plurality of UEs connected to the WBS;
    receiving, at the transceiver of the WBS from the transceiver of the content-management server, the first content and a second list including a second plurality of UEs that is at least a subset of the first plurality of UEs from the first list, the second plurality of UEs are to receive the first content, wherein (i) the second list includes at least the first UE and a second UE and (ii) a similarity score between first attributes of the first content and second attributes of a content history for the second UE is above a predetermined threshold;
    determining a confidence score associated with the second UE based at least in part on a cache availability of the second UE; and
    sending, with the transceiver of the WBS, the first content to the first UE and, based at least in part on the confidence score, the second UE.

2. The method of claim 1, wherein the first content includes a first category; and
    wherein a second content in the content history for the second UE is in the first category.

3. The method of claim 1, wherein the first content comprises an episode of a TV show or podcast; and
    wherein the content history for the second UE includes at least one other episode of the TV show or podcast.

4. The method of claim 1, wherein the sending further comprises:
    sending, with the transceiver of the WBS, the first content to the first UE at a first time; and
    sending, with the transceiver of the WBS, the first content to the second plurality of UEs on the second list in a single broadcast at a second time;
    wherein the second time is after the first time.

5. A method comprising:
    receiving, at a transceiver of a content-management server, a request from a wireless base station (WBS) for a first content for a first user equipment (UE) and a first list including a plurality of UEs in communication with the WBS; and
    selecting from the first list, with a processor of the content-management server, a second list comprising a subset of the plurality of UEs to receive the first content, wherein (i) the second list includes at least the first UE and a second UE and (ii) a similarity score between first attributes of the first content and second attributes of a content history for the second UE is above a predetermined threshold, the similarity score being based at least in part on a cache availability of the second UE.

6. The method of claim 5, further comprising:
    sending, with the transceiver of the content-management server to the WBS, the first content and the second list to cause the WBS to broadcast the first content to the second list in a single broadcast transmission;
    wherein the second list includes the first UE.

7. The method of claim 5, further comprising:
    sending, with the transceiver of the content-management server to the WBS, the first content to cause the WBS to send the first content to the first UE at a first time; and
    sending, with the transceiver of the content-management server to the WBS, the second list to cause the WBS to broadcast the first content to the second list in a single broadcast transmission at a second time;
    wherein the second list does not include the first UE; and
    wherein the second time is after the first time.

8. The method of claim 7, further comprising:
    determining, with the processor of the content-management server, that a network utilization for at least a portion of a cellular network associated with the WBS has fallen below a predetermined network utilization.

9. The method of claim 7, wherein the second time is between 2 AM and 6 AM.

10. The method of claim 7, further comprising:
receiving, with the transceiver of the content-management server, a signal from a network entity associated with a cellular network associated with the WBS, the signal indicating that a network utilization for at least a portion of the cellular network associated with the WBS has fallen below a predetermined network utilization.

11. The method of claim 10, wherein predetermined network utilization is a network utilization below 40%.

12. A method comprising:
receiving, at a transceiver of a content-management server, a request from a wireless base station (WBS) for a first content for a first user equipment (UE) and a first list including a plurality of UEs in communication with the WBS;
receiving, at the transceiver of the content-management server, a content history for each UE of the plurality of UEs;
calculating, with a processor of the content-management server, a first similarity score for a second UE of the plurality of UEs, the first similarity score being based at least partly on:
  a comparison between first attributes of the first content and second attributes of the content history for the second UE; and
  a cache availability of the second UE;
determining, with the processor of the content-management server, that the first similarity score is above a predetermined threshold; and
sending, from the content-management server to the WBS, (1) a second list including at least the first UE and the second UE and (2) the first content to be broadcast to at least the first UE and the second UE in a single broadcast transmission.

13. The method of claim 12, further comprising:
calculating, with the processor of the content-management server, a second similarity score between the first attributes of the first content and third attributes of a content history for a third UE of the plurality of UEs; and
determining, with the processor of the content-management server, that the second similarity score is above a predetermined threshold;
wherein the second list includes at least the first UE, the second UE, and the third UE.

14. The method of claim 12, wherein calculating the first similarity score between the first attributes of the first content and the second attributes of the content history for the second UE comprises:
extracting, with the processor of the content-management server, one or more of the first attributes for the first content;
extracting, with the processor of the content-management server, one or more of the second attributes for a second content in the content history of the second UE; and
comparing, with the processor of the content-management server, the one or more first attributes from the first content with the one or more second attributes from the second content.

15. The method of claim 14, wherein the one or more of the first attributes or the one or more of the second attributes comprise one or more of the group consisting of: keywords, websites, files sizes, and categories for the first content and second content.

16. The method of claim 14, wherein the one or more of the first attributes or the one or more of the second attributes comprise one or more keywords; and
wherein the first content and the second content have at least one keyword in common.

17. The method of claim 12, further comprising:
receiving, at the transceiver of the content-management server, one or more additional statistics for the second UE;
determining, with the processor of the content-management server, that an available memory for the second UE is below a predetermined threshold; and
reducing, with the processor of the content-management server, the calculated first similarity score by a predetermine amount based on the available memory for the second UE being below the predetermined threshold.

18. The method of claim 12, wherein the first content comprises a first episode of a television series; and
wherein the content history for the second UE includes at least one other episode of the television series.

* * * * *